United States Patent [19]

Keyser et al.

[11] 4,094,731
[45] June 13, 1978

[54] METHOD OF PURIFYING SILICON

[75] Inventors: Naaman H. Keyser, Hinsdale, Ill.; James C. Cline, Beverly, Ohio

[73] Assignee: Interlake, Inc., Chicago, Ill.

[21] Appl. No.: 697,865

[22] Filed: Jun. 21, 1976

[51] Int. Cl.² ............... C01b 33/02; B01j 17/08
[52] U.S. Cl. ............... 156/616 R; 156/622; 156/624; 156/DIG. 64; 23/295 R; 423/348; 29/527.6; 164/60
[58] Field of Search ............... 156/624, 621, 622, 623, 156/DIG. 64, 616 R; 23/295 R, 296 R, 273 SP, 273 F; 164/47, 58, 60, 66, 69, 70, 71, 77, 114; 264/158, 159, 114; 75/134 S; 423/324, 326, 327, 348; 29/527.6

[56] References Cited

U.S. PATENT DOCUMENTS

| | | | |
|---|---|---|---|
| 1,386,227 | 8/1921 | Becket | 423/348 |
| 2,087,347 | 7/1937 | Larsen | 164/77 X |
| 2,402,662 | 6/1946 | Ohl | 423/348 X |
| 2,872,299 | 2/1959 | Celmer et al. | 23/273 SP X |
| 3,069,240 | 12/1962 | Armand | 423/348 |
| 3,536,123 | 10/1970 | Izumi | 164/114 |
| 3,543,531 | 12/1970 | Adams | 23/273 F |
| 3,871,872 | 3/1975 | Downing et al. | 423/348 X |

FOREIGN PATENT DOCUMENTS 1,219,903  6/1966  Germany ............... 156/624

Primary Examiner—Stephen J. Emery
Attorney, Agent, or Firm—Vogel, Dithmar, Stotland, Stratman & Levy

[57] ABSTRACT

A process for producing crystalline silicon having an iron concentration less than about one-twentieth of the iron concentration of the mother liquor. Iron contaminated silicon is introduced into a mold and the mold walls are maintained at a temperature sufficient to cause silicon crystalline growth. The mother liquor is agitated to wash the exposed surfaces of the growing silicon crystals and to prevent the freezing of the top surface of the mother liquor. A hollow crystalline silicon ingot is formed and both the inner zone centrally of the crystalline ingot and the outer zone adjacent to the mold wall are removed leaving an inner zone having an iron concentration less than one-twentieth of the iron concentration of the original mother liquor.

11 Claims, No Drawings

METHOD OF PURIFYING SILICON

BACKGROUND OF THE INVENTION

High purity silicon is useful, as is well known, for producing semiconductors and many patents have been issued relating to various processes for producing high purity silicon for use in transistors and the like. Representative of the prior art is U.S. Pat. No. 2,739,088 issued Mar. 20, 1956 to W. G. Pfann for PROCESS FOR CONTROLLING SOLUTE SEGREGATION BY ZONE-MELTING. In the Pfann patent, a small zone of a silicon bar is melted and thereafter allowed to freeze while the next adjacent zone is melted. By moving the molten zone longitudinally of the bar solutes concentrate at the end of the bar leaving a highly refined silicon bar. Purities on the order of less than one part per million are obtainable by the use of zone melting processes.

A similar process is disclosed in U.S. Pat. No. 2,773,923 issued Dec. 11, 1956 to C. G. Smith for ZONE-REFINING APPARATUS. The Smith patent discloses apparatus for purifying semiconductor materials such as silicon or germanium. The method disclosed in the patent is similar to that disclosed in the Pfann patent and involves successive melting of adjacent zones along a bar of material. Silicon in the highly refined state is also useful in solar electric cells and great quantities of highly refined silicon are needed for such cells. Zone heating processes and apparatus such as those described in the Pfann and Smith patents are entirely adequate to produce high purity silicon. However, it is generally wasteful to use such processes and apparatus on commercial grade silicon which contains impurities at a sufficiently high concentration to make the use of the zone melting processes and apparatus therefor inefficient. A method for producing an intermediate grade silicon is needed in which commercial grade silicon would be purified less than that necessary for semiconductors or solar heating cells but far greater than commercial grade silicon is needed. The method would have to accommodate large tonnages of commercial grade silicon while at the same time producing in a relatively quick and efficient manner crystalline silicon having significantly less impurities than the commercial grade. Impurities normally encountered in commercial grade silicon are iron, aluminum, calcium, phosphorous and boron.

U.S. Pat. No. 2,087,347, issued July 20, 1937 to B. M. Larsen for METHOD OF SOLIDIFYING MOLTEN METALS, teaches a method for producing a metal ingot of steel or iron in which the metal composition is uniform. The method includes providing relative motion between the solid and liquid phases in a molten metal bath. The patent is directed to avoiding voids due to the escape of gas during the formation of solids and results in a solid steel ingot of uniform composition.

Yet another patent relating to this general subject matter is U.S. Pat. No. 3,249,425, issued May 3, 1966 to O. C. Aamot for PROCESS FOR FREEZE-REFINING A METAL. The Aamot patent teaches the purification of metals and alloys specifically aluminum, by agitation between liquid and solid phases while simultaneously cooling the solid phase and heating the liquid phase. The Aamot patent teaches a method of producing solid ingots from molten liquor wherein the solid ingot has less impurities than the liquid phase. Neither the Larsen nor the Aamot patent teaches a method sufficient to produce material of the desired purity as a starting material for zone refining to produce the silicon solar cells discussed above. Preferably, the starting silicon for the zone refining will have no more than 0.05 percent by weight iron impurity and less is desirable. Commercial grade silicon may contain 0.7 percent by weight iron or more, whereby substantial purification must take place to produce a starting material for zone refining.

SUMMARY OF THE INVENTION

It is a general object of the present invention to provide a method of purifying commercial grade silicon to produce crystalline silicon having a reduced iron content.

An important object of the present invention is to provide a method of producing crystalline silicon having an iron content less than about one-twentieth of the iron content of the mother liquor, said method comprising introducing into a mold a molten mother liquor of silicon contaminated with iron, maintaining the mold wall at a temperature sufficient to cause silicon crystals to grow thereon, providing relative movement between the mold wall with the silicon crystals thereon and the molten mother liquor to wash the exposed surfaces of the silicon crystals with the mother liquor during the further growth of the silicon crystals, decanting the mother liquor from the mold to leave a hollow silicon ingot having an outer zone adjacent to the mold wall and an inner zone centrally of the silicon ingot, both the outer and inner zones having more than one-twentieth of the iron content of the mother liquor, and discarding the outer and inner zones to leave a central crystalline portion of the silicon ingot with an iron content less than about one-twentieth of the original mother liquor.

Another object of the present invention is to provide a method of the type set forth in which the molten mother liquor in the mold is prevented from freezing at the exposed surfaces thereof while simultaneously allowing the molten mother liquor to cool sufficiently to cause silicon crystals to grow on the mold wall.

A further object of the present invention is to provide a method of the type set forth in which the molten mother liquor is decanted from the mold to leave a hollow silicon ingot of less than about 60% by weight of the original mother liquor.

These and other objects of the present invention may more readily be understood by reference to the following specification wherein the specific examples are set out by way of illustration only and are not meant to limit the invention beyond the true spirit and scope thereof.

PREFERRED EMBODIMENTS

EXAMPLE 1

23 lbs. of silicon containing 0.48 percent by weight iron, was heated to a temperature of 3100° F. in a 50 lb. capacity, 3,000 cycle, 100 kilowatt and 400/800 volt induction furnace lined with a carbon crucible. The melt was poured into a ladle and stirred with a carbon rod stirrer for 11 minutes. The stirring action prevented the top of the mother liquor from freezing and limited the solidification front to the bottom and the walls of the ladle. After 11 minutes, 8 lbs. of mother liquor was decanted and analyzed. The iron content was 0.93 percent by weight. 10 lbs. of crystalline silicon in the form of a hollow ingot remained in the ladle and found to have an iron content of 0.12 percent by weight. Balls of silicon were formed during the stirring and they were analyzed and found to have an iron content of 0.48 percent by weight. In all the examples, care must be taken to decant the liquor well before the eutectic temperatures of about 2206° F. is reached.

EXAMPLE 2

23 lbs. of commercial grade silicon having an iron content of 0.43 weight percent was heated as in Example 1 and introducing to the ladle and stirred with a carbon rod stirrer for 12 minutes. 6 lbs. of the mother liquor was decanted which had an iron content of 0.9 percent by weight and 9 lbs. of silicon crystals forming a hollow ingot remained in the ladle with an iron content of 0.17 percent by weight. Balls of silicon formed around the carbon rod stirrer, which balls weighed 8 lbs. and had an iron content of 0.39 percent by weight.

EXAMPLE 3

4,200 lbs. of commercial grade silicon containing 0.38 percent by weight iron was transferred from an electric arc furnace to a cone shaped vessel. The molten mother liquor was stirred by means of a carbon stirrer powered by an air motor for 33 minutes at 35 rpm. The stirring action prevented the top of the mother liquor from freezing and promoted the solidification on the bottom and the walls of the container. 1,890 lbs. of mother liquor was decanted from the vessel with an iron content of 0.75 percent by weight, 1,420 lbs. of crystalline silicon remained in the vessel forming a hollow ingot with an iron content of 0.21 percent by weight. Balls of silicon were formed during the stirring which weighed 620 lbs. with an iron content of 0.35 percent by weight.

EXAMPLE 4

4,390 lbs. of commercial grade silicon having an iron content of 0.65 percent by weight was transferred from an electric arc furnace to a cone shaped vessel. The mother liquor was stirred by a carbon rod stirrer powered by a air motor for 1 hour and 25 minutes at 35 rpm. 1,250 lbs. of mother liquor was decanted into a mold. Analysis of the decanted mother liquor showed it had an iron content of 1.6 percent by weight. Silicon crystals in the form of a hollow ingot remained in the vessel, the ingot weighing 2,210 lbs. and having an iron content of 0.2 percent by weight. Balls of silicon crystals formed around the carbon stirrer and weighed 930 lbs. with an iron content of 0.52 percent by weight.

EXAMPLE 5

4,330 lbs. of commercial grade silicon having an iron content of 0.5 percent by weight was transferred from an electric furnace to a cone shaped vessel. The mother liquor was stirred with a carbon rod stirrer powered by an air motor at 35 rpm for 5 minutes at 15 minute intervals for a total time of 3½ hours. 1,480 lbs. of mother liquor was decanted with an iron content of 0.9 percent by weight. 1,770 lbs. of crystalline silicon remained in the vessel as a hollow ingot having an iron content of 0.21 percent by weight. Balls of silicon formed about the carbon stirrer and weighed 1,080 lbs. with an iron content of 0.48 percent by weight.

EXAMPLE 6

4,200 lbs. of commercial grade silicon having an iron content of 0.63 percent by weight was transferred from an electric arc furnace to a cone shaped vessel. The mother liquor was stirred for periods of 5 minutes at 15 minute intervals for a total time of 3½ hours; thereafter, the mother liquor was decanted and analyzed to find an iron content of 0.75 percent by weight. The crystalline silicon remaining in the vessel was analyzed and found to have an iron content of 0.38 percent by weight and the balls of silicon crystals formed about the stirrer were analyzed and found to have an iron content of 0.6 percent by weight.

EXAMPLE 7

23 lbs. of commercial grade silicon containing 0.55 percent by weight iron was heated to a temperature of about 3,100° F. in a 50 lb. capacity, 3,000 cycle, 100 kilowatt, 400/800 volt induction furnace lined with a carbon crucible. The molten mother liquor was poured into a ladle and agitated for 11 minutes by injecting nitrogen gas into the ladle through a carbon lance. When the top surface of the mother liquor started to freeze, a carbon rod was used to stir the liquor thereby preventing freezing. After 11 minutes, 11 lbs. of mother liquor was decanted and found to have an iron content of 0.9 percent by weight. 11 lbs. of crystalline silicon remained in the ladle as a hollow ingot with an iron content of 0.2 percent by weight. A 1 lb. ball was formed during stirring with an iron content of 0.45 percent by weight.

EXAMPLE 8

Example 7 was repeated using 23 lbs. of commercial grade silicon having an iron content of 0.5 percent by weight. The decanted mother liquor had an iron content of 0.8 percent by weight and the crystalline ingot remaining in the ladle had an iron content of 0.28 percent by weight. A carbon rod was used to stir the mother liquor for 3 minutes and a 4 lb. ball formed about the rod with an iron content of 0.46 percent by weight.

EXAMPLE 9

Example 7 was repeated with a commercial grade silicon having an iron content of 0.6 percent by weight. The nitrogen gas was bubbled through the mother liquor for 10 minutes and thereafter 8 lbs. of the mother liquor was decanted having an iron content of 0.95 percent by weight. The crystalline silicon ingot remaining in the ladle weighed 9 lbs. and had a 0.28 percent by weight iron content.

EXAMPLE 10

4,200 lbs. of commercial grade silicon quartz having an iron content of 0.55 percent by weight was transferred from an electric arc furnace into a cone shaped vessel. The mother liquor was bubbled for 35 minutes by introducing a total of 100 SCF nitrogen gas into the molten bath through a carbon lance. Intermittently the mother liquor was stirred with carbon rods to prevent freezing of the exposed surface. After 35 minutes, the decanted mother liquor was analyzed and found to have a 0.7 percent by weight iron, whereas the crystalline silicon ingot formed in the vessel had an iron content of 0.33 percent by weight.

EXAMPLE 11

4,200 lbs. of commercial grade silicon containing 0.63 percent by weight iron was transferred from an electric arc furnace into a cone shaped vessel. Oxygen gas was introduced into the bath through a carbon lance for 45 minutes to induce bubbling of the mother liquor. Simultaneously the bath was stirred by carbon rod stirrers for a period of 15 minutes. The bubbling and stirring prevented the top of the mother liquor from freezing and promoted solidification on the bottom and the walls of the vessel. The mother liquor that did not solidify in 45 minutes was decanted and found to contain 0.75 percent by weight iron whereas the crystalline silicon remaining in the vessel was 0.37 percent by weight iron.

In general, it is preferred to crystallize silicon upwards from the bottom of the vessel and inwards from the walls of the vessel or mold while simultaneously agitating sufficiently to remove the iron rich liquid from the interstices of the solidifying crystalline silicon.

As seen from the foregoing, commercial grade silicon having an iron content of between about 0.38 percent by weight and 0.65 percent by weight has been purified such that the crystalline silicon is present with iron in the amount of 0.12 percent by weight to 0.38 percent by weight. While this purification is good, it is insufficient to provide the desired starting materials discussed above. It was surprisingly discovered, however, that the gross averages given in each of the foregoing eleven examples did not represent a true picture of the ingot formed by the described process. In fact, contrary to the teaching of the Larsen patent the ingot was not of uniform composition but when the ingots were sectioned it was discovered that the outer zone adjacent to the mold or vessel wall had a relatively high percentage of iron and the inner zone centrally of the hollow ingot also had a high degree of iron content. Removal of both the inner and the outer zones of the ingot provided a central portion having the desired purity of crystalline silicon. Specifically, central portions of the crystalline silicon ingot have been analyzed and found to contain as little as 0.0035 percent by weight iron, well below the 0.05 percent by weight iron desired for the starting materials discussed above.

EXAMPLE 12

5,290 lbs. of commercial grade silicon was transferred from an electric arc furnace to a conical shaped vessel and stirred with carbon rods for one hour and twenty-five minutes. The mother liquor contained 0.46 percent by weight iron, 0.014 percent by weight calcium, and 0.27 percent by weight aluminum. After the one hour and twenty-five minutes, 1,980 lbs. of molten material was decanted leaving a frozen skull or ingot of 2,060 lbs. and balls of 1,250 lbs.

The skull or ingot contained on the average 0.18 percent by weight iron, 0.12 percent by weight calcium and 0.05 percent by weight aluminum. The decanted liquid contained 1.25 percent by weight iron, 0.11 percent by weight calcium and 0.33 percent by weight aluminum.

A 3½ inch thick segment was sliced parallel to the ingot wall and analyzed for iron content. Starting with the one-fourth inch zone adjacent to the vessel wall the iron content was found to be 0.155 percent by weight. The next one-eighth inch analyzed had an iron content of 0.105 percent by weight. The next one-eighth inch, moving along the ingot thickness from the vessel wall toward the central portion of the ingot, was found to have an iron content of 0.055 percent by weight. The next one-fourth inch segment was analyzed and found to have an iron content of 0.009 percent by weight. Thereafter, a one-half inch segment was analyzed and found to have an iron content of 0.005 percent by weight as did the next one-eighth inch segment. The following one-eighth inch segment had an iron content of 0.016 percent by weight and the next three-fourths inch segment had an iron content of 0.010 percent by weight. A one-half inch segment was then analyzed and found to have an iron content of 0.025 percent by weight and the following one-fourth inch segment had an iron content of 0.055 percent by weight and the last approximately one-eighth inch segment had an iron content of 0.235 percent by weight.

As can be seen, the inner zone consisting of the first one-half inch segment analyzed out to an iron content greater than 0.1 weight percent whereas the central 2¼ inch portion analyzed out to about 0.012 percent by weight iron. The outer zone or the central most three-eighths inches of the ingot analyzed out to greater than 0.1 percent by weight iron. Accordingly, it is seen that the central portion contains an iron content far less than the inner and outer zones and substantially less than the iron content of the mother liquor. Certainly, after one-half inch of the inner zone and one-half inch of the outer zone have been removed, the entire central portion is sufficiently pure to form the starting material for the zone refining process set forth above. While the thickness of the crystalline ingot was about 3½ inches, the individual segments do not total 3½ inches since some of the ingot was lost to the action of the saw blade used to section the ingot. Sectioning was done parallel to the vessel wall.

Phosphorous content remained substantially constant across the entire thickness of the ingot, as did the boron content. Aluminum segregated in a manner similar to iron, but not to nearly as great an extent. Aluminum segregation ranged from about 0.08 percent by weight at both the vessel wall and at the innermost zone to 0.004 to 0.01 percent by weight in the central portion. Aluminum purification was about ⅛th to 1/20th in comparison to iron purification of from about 1/20th to 1/100th.

EXAMPLE 13

4,760 lbs. of commercial grade silicon was transferred from an electric arc furnace to a conical shaped vessel and stirred with carbon rods for one hour. The mother liquor contained 0.40 percent by weight iron, 0.13 percent by weight calcium and 0.27 percent by weight aluminum. After one hour, 1,270 lbs. of molten material was decanted leaving a frozen skull or ingot of 1,840 lbs. and balls of 950 lbs.

The skull or ingot contained, on the average, 0.14 percent by weight iron, 0.037 percent by weight calcium and 0.014 percent by weight aluminum. The decanted liquor contained 1.10 percent by weight iron, 0.19 percent by weight calcium and 0.20 percent by weight aluminum.

The skull or ingot was about 2⅝th inches thick and a segment was removed and sectioned parallel to the vessel wall. The first three-fourths inch segment adjacent to the vessel wall, this being the outer zone, had an iron content of 0.03 percent by weight. The one-half inch segment at the innermost part of the ingot, this being the inner zone, had an iron content of 0.098 percent by weight. The 1½ inch central portion had an iron content of 0.0035 percent by weight, a purity well within the upper limits for the starting materials for a zone refining process. The iron content of the central portion was less than one-hundredth of the mother liquor.

As can be seen, therefore, iron purities greater than expected have been provided by the process of the subject invention which requires washing of the exposed surfaces of the silicon crystals during the formation thereof to produce the iron-poor crystalline silicon and requires the sectioning of the ingot formed to discard both the inner and outer zones which contain a relatively high iron content while retaining the central portion which contains the purified silicon crystals.

Both calcium and aluminum can be chemically removed to some extent by reaction of the commercial grade silicon with chlorine gas. All of the commercial grade silicon used in Examples 1 to 13 was pretreated with chlorine gas to leach both calcium and aluminum therefrom. Neither boron nor phosphorous is affected by chlorine gas and has to be removed by other means.

In Example 12, aluminum content in the crystalline ingot ranged from about 0.08 percent by weight in the inner and outer zones to about 0.008 percent by weight, on the average, in the central portion, representing a purification of about ten. In Example 13, the aluminum purification was somewhat less than ten, more on the order of five. Nevertheless, aluminum purification did occur, but nowhere near the extent of the iron purification. Reiterating, iron purification was on the order of twenty to one hundred whereas aluminum purification was on the order of five to ten.

As may be seen, there has been provided a method of producing crystalline silicon having an iron content between about one-twentieth and one-hundredth of the iron content of the mother liquor. The inventive method includes washing the exposed surfaces of the silicon crystals after formation thereof from the mother liquor to provide a crystalline silicon ingot, and thereafter, diverting to other uses both the inner and outer zones of the ingot while retaining the central crystalline portion having an iron content less than one-twentieth of the mother liquor and in some cases, as little as one-hundredth of the mother liquor.

While there has been disclosed herein what is at the present time considered to be the preferred embodiments, it will be understood that various modifications may be made herein without departing from the true spirit and scope of the invention and it is intended to cover such modifications and alterations in the appended claims.

What is claimed is:

1. A batch method of producing crystalline silicon having an iron concentration less than about one-twentieth of the iron concentration of the mother liquor, said method comprising introducing a molten mother liquor of silicon contaminated with iron at a temperature higher than the melting point of pure silicon into a ladle-shaped mold having a bottom and side walls, maintaining the mold at a temperature sufficient to cause silicon crystals to grow thereon, providing relative movement between the mold wall with the growing silicon crystals and the molten mother liquor to continuously wash the exposed growing surfaces of the silicon crystals with the mother liquor during the further growth of the silicon crystals and maintaining the top surface thereof substantially liquid by providing relative movement between the mold with the silicon crystals thereon and the molten mother liquor, decanting the mother liquor from the mold before the liquor temperature reaches 2206° F. to leave a hollow ladle-shaped silicon ingot of less than about 60% by weight of the original mother liquor having an outer zone adjacent to the mold and an inner zone centrally of said silicon ladle-shaped ingot, both the outer and inner zones having more than one-twentieth of the iron concentration of the mother liquor, and discarding the outer and inner zones to leave an annular crystalline portion of the silicon ingot with an iron concentration less than about one-twentieth of the iron concentration in the original mother liquor.

2. The method set forth in claim 1, wherein said relative movement between said mold wall and the molten mother liquor is provided by stirring the molten mother liquor.

3. The method set forth in claim 1, wherein the relative movement between said mold wall and the molten mother liquor is provided by bubbling a gas through the mother liquor.

4. The method set forth in claim 1, wherein the relative movement between said mold wall and the molten mother liquor is provided by stirring the molten mother liquor while bubbling a gas therethrough.

5. The method set forth in claim 1, wherein said relative movement between said mold wall and the molten mother liquor is provided by vibrating said mold.

6. The method set forth in claim 1, wherein said relative movement between said mold wall and the molten mother liquor is provided by rotating said mold.

7. The method set forth in claim 1, wherein said relative movement between said mold wall and the molten mother liquor is provided intermittently during the growth of the silicon crystals.

8. The method set forth in claim 1, wherein the iron content of said annular crystalline portion of said silicon ingot is less than about 0.05 percent by weight.

9. The method set forth in claim 1, wherein aluminum present in the annular crystalline portion is one-fifth to one-twentieth of the aluminum present in the mother liquor.

10. The method set forth in claim 1, wherein said inner and outer zones each comprises about one-half inch of the ingot taken parallel to the mold wall.

11. The method set forth in claim 1, wherein the temperature of the liquor introduced into the mold is above 1500° C.

* * * * *